United States Patent
Venkatraman et al.

(10) Patent No.: US 11,063,618 B2
(45) Date of Patent: Jul. 13, 2021

(54) IQ MISMATCH ESTIMATION WITH PRE-DISTORTION

(71) Applicant: TEXAS INSTRUMENTS INCORPORATED, Dallas, TX (US)

(72) Inventors: Sashidharan Venkatraman, Bengaluru (IN); Jawaharlal Tangudu, Bengaluru (IN); Sarma Sundareswara Gunturi, Bengaluru (IN); Ram Narayan Krishna Nama Mony, Kanyakumari (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/943,432

(22) Filed: Jul. 30, 2020

(65) Prior Publication Data
US 2021/0083697 A1    Mar. 18, 2021

(30) Foreign Application Priority Data

Sep. 13, 2019    (IN) .............................. 201941036937

(51) Int. Cl.
*H04B 1/04*    (2006.01)
*H04L 25/02*    (2006.01)

(52) U.S. Cl.
CPC ........... *H04B 1/04* (2013.01); *H04L 25/0202* (2013.01); *H04B 2001/0425* (2013.01)

(58) Field of Classification Search
CPC . H04B 7/10; H04B 7/12; H01Q 21/24; H01Q 13/02; H01Q 21/26; H01Q 1/247; H01Q 19/10
See application file for complete search history.

(56) References Cited

U.S. PATENT DOCUMENTS

| 8,737,533 B2 * | 5/2014 | Andgart .............. H04L 27/2647 375/322 |
| 2005/0180534 A1 * | 8/2005 | Brotje ................. H04L 27/2647 375/350 |
| 2020/0169434 A1 | 5/2020 | Tangudu et al. |
| 2020/0177417 A1 | 6/2020 | Tangudu et al. |

* cited by examiner

*Primary Examiner* — Jean B Corrielus
(74) *Attorney, Agent, or Firm* — John R. Pessetto; Charles A. Brill; Frank D. Cimino (57) ABSTRACT

An IQ mismatch estimation circuit includes a raw channel estimation circuit, a reference channel estimation circuit, a digital predistortion (DPD) bin identification circuit, a channel estimate pruning circuit, and an IQ correction coefficient generation circuit. The raw channel estimation circuit generates raw channel estimates for a plurality of frequency bins of a baseband signal. The reference channel estimation circuit identifies a reference channel estimate based on the raw channel estimates. The DPD bin identification circuit identifies, based on the reference channel estimate, the frequency bins for which the raw channel estimates are based on a DPD expansion signal. The channel estimate pruning circuit generates pruned raw channel estimates by discarding the raw channel estimates of the frequency bins identified by the DPD bin identification circuit. The IQ correction coefficient generation circuit generates IQ mismatch correction coefficients based on the pruned raw channel estimates.

23 Claims, 8 Drawing Sheets

IQ MISMATCH ESTIMATION WITH PRE-DISTORTION

CROSS-REFERENCE TO RELATED APPLICATIONS

The present application claims priority to Indian Provisional Patent Application No. 201941036937, filed Sep. 13, 2019, entitled "TX IQ MISMATCH AND LO LEAKAGE ESTIMATION WITH DPD SIGNALS," which is hereby incorporated herein by reference in its entirety.

BACKGROUND

A zero-intermediate frequency (IF) transmitter employs homodyne or direct up-conversion to transmit a pair of quadrature signals, i.e., signals that differ in phase by 90 degrees. The reference signal of the pair of quadrature signals, which is "in-phase," is referred to as I signal. The signal that is shifted 90 degrees, and is in "quadrature" phase, is referred to as Q signal. During the direct up-conversion, the I and Q baseband signals are mixed with the in-phase and quadrature-phase components of a local oscillator signal to generate RF signals for transmission.

SUMMARY

Apparatus and methods for reducing IQ mismatch and local oscillator leakage in zero-intermediate frequency (IF) transmitters that include digital predistortion are disclosed herein. In one example, an IQ mismatch estimation circuit includes a raw channel estimation circuit, a reference channel estimation circuit, a digital predistortion (DPD) bin identification circuit, a channel estimate pruning circuit, and an IQ correction coefficient generation circuit. The raw channel estimation circuit is configured to generate raw channel estimates for a plurality of frequency bins of a baseband signal. The reference channel estimation circuit is configured to identify a reference channel estimate based on the raw channel estimates. The DPD bin identification circuit is configured to identify, based on the reference channel estimate, the frequency bins for which the raw channel estimates are based on a DPD expansion signal. The channel estimate pruning circuit is configured to generate pruned raw channel estimates by discarding the raw channel estimates of the frequency bins identified by the DPD bin identification circuit. The IQ correction coefficient generation circuit is configured to generate IQ mismatch correction coefficients based on the pruned raw channel estimates.

In another example, a zero IF transmitter includes a power amplifier circuit, a DPD circuit, an IQ mismatch estimation circuit, and an IQ mismatch correction circuit. The power amplifier circuit is configured to amplify a signal to be transmitted. The DPD circuit is configured to pre-compensate a baseband signal for non-linearity of the power amplifier circuit. The IQ mismatch estimation circuit includes a raw channel estimation circuit, a reference channel estimation circuit, a digital predistortion (DPD) bin identification circuit, a channel estimate pruning circuit, and an IQ correction coefficient generation circuit. The raw channel estimation circuit is configured to generate raw channel estimates for a plurality of frequency bins of a predistorted baseband signal. The reference channel estimation circuit is configured to identify a reference channel estimate based on the raw channel estimates. The DPD bin identification circuit is configured to identify the frequency bins for which the raw channel estimates are based on a DPD expansion signal. The channel estimate pruning circuit is configured to generate pruned raw channel estimates by discarding the raw channel estimates of the frequency bins identified by the DPD bin identification circuit. The IQ correction coefficient generation circuit is configured to generate IQ mismatch correction coefficients based on the pruned raw channel estimates. The IQ mismatch correction circuit is configured to apply the IQ mismatch correction coefficients to compensate the predistorted baseband signal for IQ mismatch.

In a further example, a method for IQ mismatch estimation includes generating raw channel estimates for a plurality of frequency bins of a baseband signal predistorted by digital predistortion (DPD). A reference channel estimate is identified based on the raw channel estimates. The frequency bins for which the raw channel estimates are predominately based on a DPD expansion signal are identified based on the reference channel estimate. Pruned raw channel estimates are generated by discarding the raw channel estimates of the frequency bins identified as predominately based on the DPD expansion signal. IQ mismatch correction coefficients are generated based on the pruned raw channel estimates.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an openended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

When generating RF signals in a zero-IF transmitter, it is important to maintain the amplitude and phase relationship between the in-phase (I) and quadrature (Q) signals to ensure an accurate signal transmission. It is also important to maintain the phase relationship between the in-phase and quadrature-phase components of the local oscillator to prevent a phase skew. In practice, however, errors such as an IQ gain/phase imbalance existing in a zero-IF transmitter impair the amplitude and phase relationship between the I and Q components of the RF signals. The gain/phase imbalance is frequency dependent, that is, the imbalance is different for every baseband frequency due to baseband and RF filter mismatches in I and Q paths. Transmission of the IQ RF signals is further complicated by direct current (DC) offset in IQ signals. The DC offset causes the local oscillator (LO) signal applied to modulate the baseband data to leak into the transmission (i.e., LO leakage), or the local oscillator can directly leak into the transmission causing LO leakage.

Figure 1:
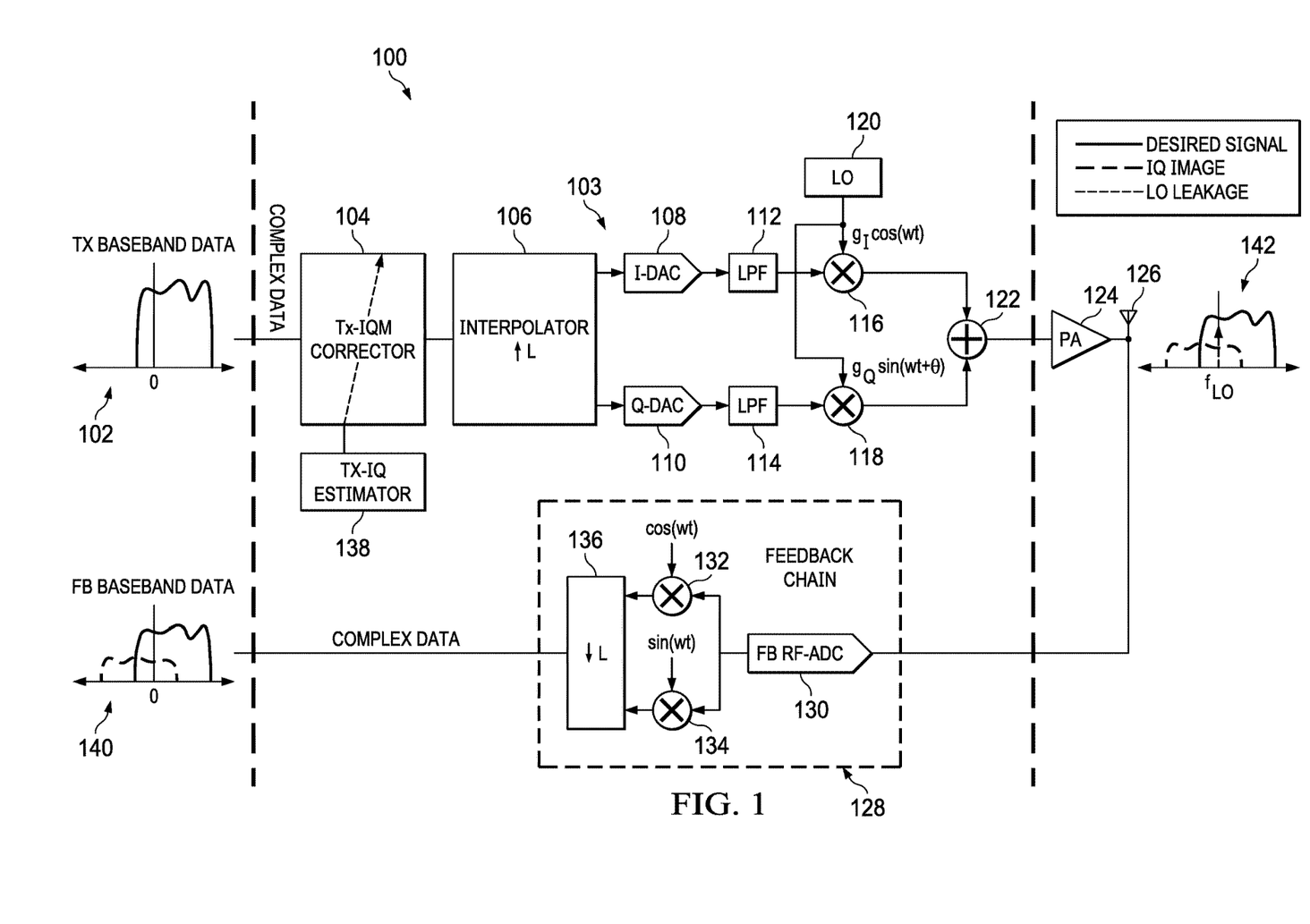
FIG. 1 shows a block diagram for a zero-intermediate frequency (IF) transmitter in accordance with the present disclosure.

FIG. 1 shows a block diagram for a zero-intermediate frequency (IF) transmitter in accordance with the present disclosure. The zero-IF transmitter 100 includes a transmit chain 103 and a feedback chain 128. The transmit chain 103 processes transmit baseband data 102 (also referred to as baseband signal) for transmission. The transmit baseband data 102 is complex digital data comprising real and imaginary data. The feedback chain 128 processes data provided at the output of the transmit chain 103 for use in IQ mismatch correction, local oscillator leakage correction, digital predistortion for power amplifier non-linearity, etc.

The transmit chain 103 includes IQ mismatch correction circuit 104, interpolator 106, digital-to-analog converter 108, digital-to-analog converter 110, low-pass filter 112, low-pass filter 114, mixer 116, mixer 118, a local oscillator (LO) circuit 120, summation circuit 122, and power amplifier 124. The IQ mismatch correction circuit 104 processes the transmit baseband data 102 to correct IQ mismatch and LO leakage. The interpolator 106 increases the sampling rate of the data output by the IQ mismatch correction circuit 104. Real (I) data output of the interpolator 106 is converted to an analog signal by the digital-to-analog converter 108, low-pass filtered by the low-pass filter 112, and mixed with a cosine output of the LO circuit 120 by the mixer 116. Similarly, the imaginary (Q) data output of the interpolator 106 is converted to an analog signal by the digital-to-analog converter 110, low-pass filtered by the low-pass filter 114, and mixed with a sine output of the LO circuit 120 by the mixer 118. The outputs of the mixer 116 and the mixer 118 are summed by the summation circuit 122 and provided to the power amplifier 124. The power amplifier 124 amplifies the output of the summation circuit for transmission. The output signal 142 of the power amplifier 124 is provided to an antenna 126.

The output signal 142 includes the transmit baseband data 102, an IQ image of the transmit baseband data 102, and an LO leakage signal. The IQ image results from mismatch of the digital-to-analog converter 108 and the digital-to-analog converter 110, the low-pass filter 112 and the low-pass filter 114, and/or the mixer 116 and the mixer 118. LO leakage is caused by DC offset injected by any of the circuits of the transmit chain 103 upstream of the mixers 116 and 118 and produces a tone at the LO frequency. LO leakage can also be caused by leakage of LO directly onto Tx output. The IQ image produced by IQ mismatch mirrors the transmit baseband data 102 about the LO frequency.

The feedback chain 128 digitizes and down-converts the signal output by the power amplifier 124 for use in estimating and correcting IQ mismatch and LO leakage. The feedback chain 128 includes an analog-to-digital converter 130, a mixer 132, a mixer 134, and a decimator 136. The analog-to-digital converter 130 digitizes the output signal 142 provided by the power amplifier 124. The output signal 142 includes the transmit baseband data 102, an IQ image of the output signal 142 (the transmit baseband data 102 mirrored about the LO frequency caused by IQ mismatch in the transmit chain 103), and LO leakage (a tone at the LO frequency caused by DC offset in the transmit chain 103) to the extent that the IQ image and LO leakage are not compensated by the IQ mismatch correction circuit 104.

The mixer 132 mixes the digital output of the analog-to-digital converter 130 with cosine samples provided by the LO circuit 120 to down-convert the digitized signal. Similarly, the mixer 134 mixes the digital output of the analog-to-digital converter 130 with sine samples provided by the LO circuit 120 to down-convert the digitized signal. The decimator 136 reduces the sampling rate of the mixer outputs to produce feedback baseband data 140.

The IQ mismatch estimation circuit 138 applies the transmit baseband data 102 and the feedback baseband data 140 to estimate the response of the channel formed by the transmit chain 103 and the feedback chain 128, estimate IQ mismatch in the transmit chain 103, estimate LO leakage in the transmit chain 103, and generate IQ mismatch and LO leakage correction coefficients for use by the IQ mismatch correction circuit 104 in compensating for the IQ mismatch and the LO leakage.

Figure 2:
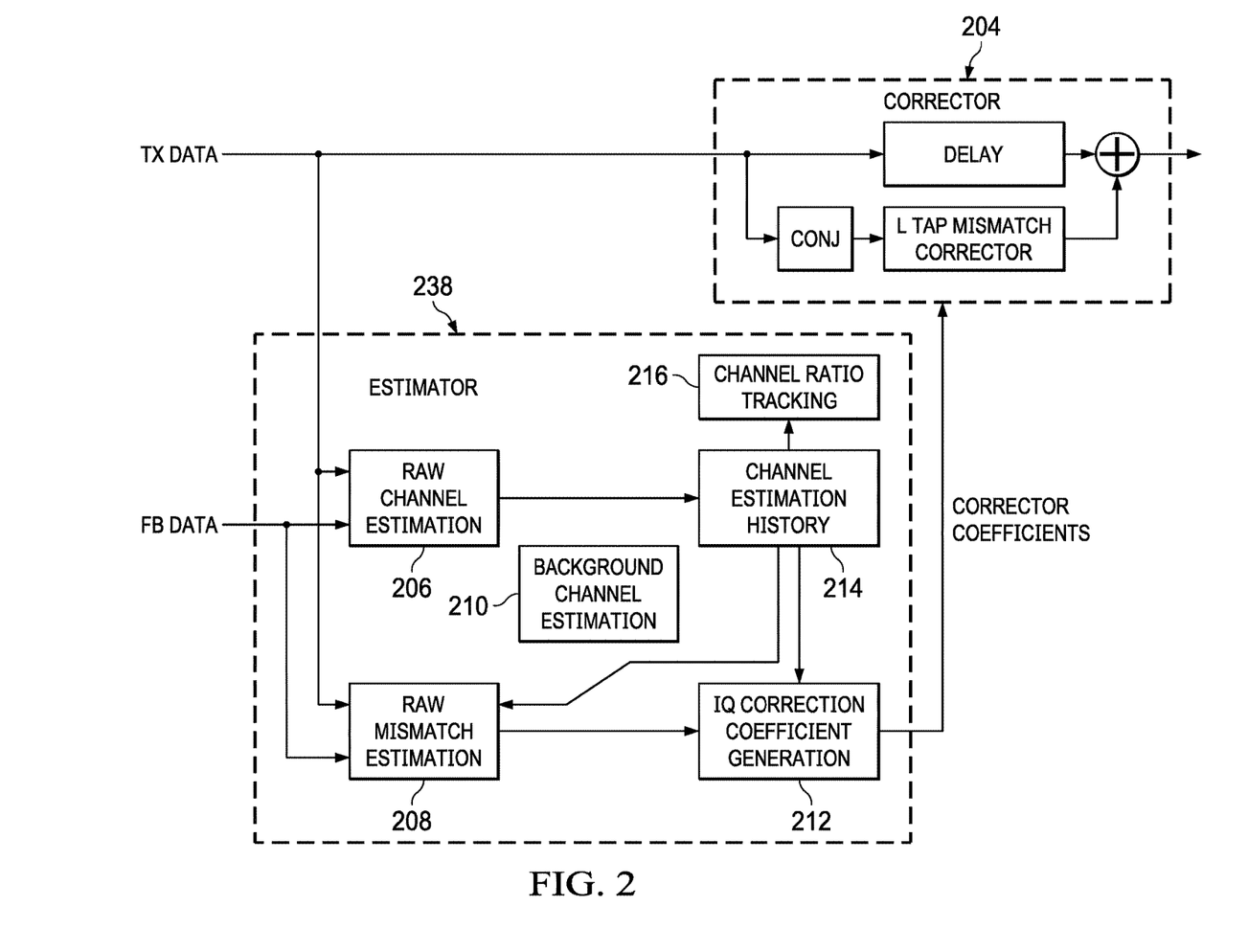
FIG. 2 shows an example IQ mismatch correction circuit and an example IQ mismatch estimation circuit.

FIG. 2 shows an example IQ mismatch correction circuit 204 and an example IQ mismatch estimation circuit 238. The IQ mismatch correction circuit 204 and the IQ mismatch estimation circuit 238 are implementations of the IQ mismatch correction circuit 104 and the IQ mismatch estimation circuit 138 respectively. The IQ mismatch correction circuit 204 applies the correction coefficients provided by the IQ mismatch estimation circuit 238 to filter the conjugate of the transmit baseband data 102, where the filtering compensates for IQ mismatch. LO leakage is corrected by adding/subtracting a complex DC offset in baseband.

The IQ mismatch estimation circuit 238 includes a raw channel estimation circuit 206, a raw mismatch estimation circuit 208, a background channel estimation circuit 210, an IQ correction coefficient generation circuit 212, a channel estimation history circuit 214, and a channel ratio tracking circuit 216.

The raw mismatch estimation circuit 208 estimates IQ mismatch in the frequency domain. Using frequency domain cross-correlations of the transmit baseband data 102 and the feedback baseband data 140, the raw channel estimate and raw IQ-mismatch estimates at signal frequencies (frequency bins) in the frequency domain are obtained. If the transmit baseband data 102 is denoted by $X(f)$ and the feedback baseband data 140 is denoted by $Y(f)$, then the raw IQ-mismatch estimate at frequency—f, is denoted by:

$$H_{IQ}(-f) = \frac{\sum X(f)Y(-f)}{\sum |X(f)|^2} \quad (1)$$

where:
$\sum |X(f)|^2$ is power of the transmit baseband data 102 (raw signal power); and the summation is done over multiple sets of frequency domain data.

Similarly, the raw channel estimation circuit 206 generates raw channel estimates for the frequency bins of the transmit baseband data 102 and the feedback baseband data 140. A raw channel estimate at a frequency f is generated as:

$$H_{ch}(f) = \frac{\sum X*(f)Y(f)}{\sum |X(f)|^2} \quad (2)$$

where:
$\sum X^*(f)Y(f)$ is cross-correlation of the transmit baseband data 102 and the feedback baseband data 140 (signal cross correlation).

The channel estimation history circuit 214 stores and tracks channel estimates generated by the raw channel estimation circuit 206 as channel estimation history values at frequency bins used in IQ mismatch estimation. The channel ratio tracking circuit 216 stores channel ratio values for each frequency bin. A channel ratio value is a ratio of a channel estimate at given frequency to corresponding value of a reference frequency bin.

Figure 3:
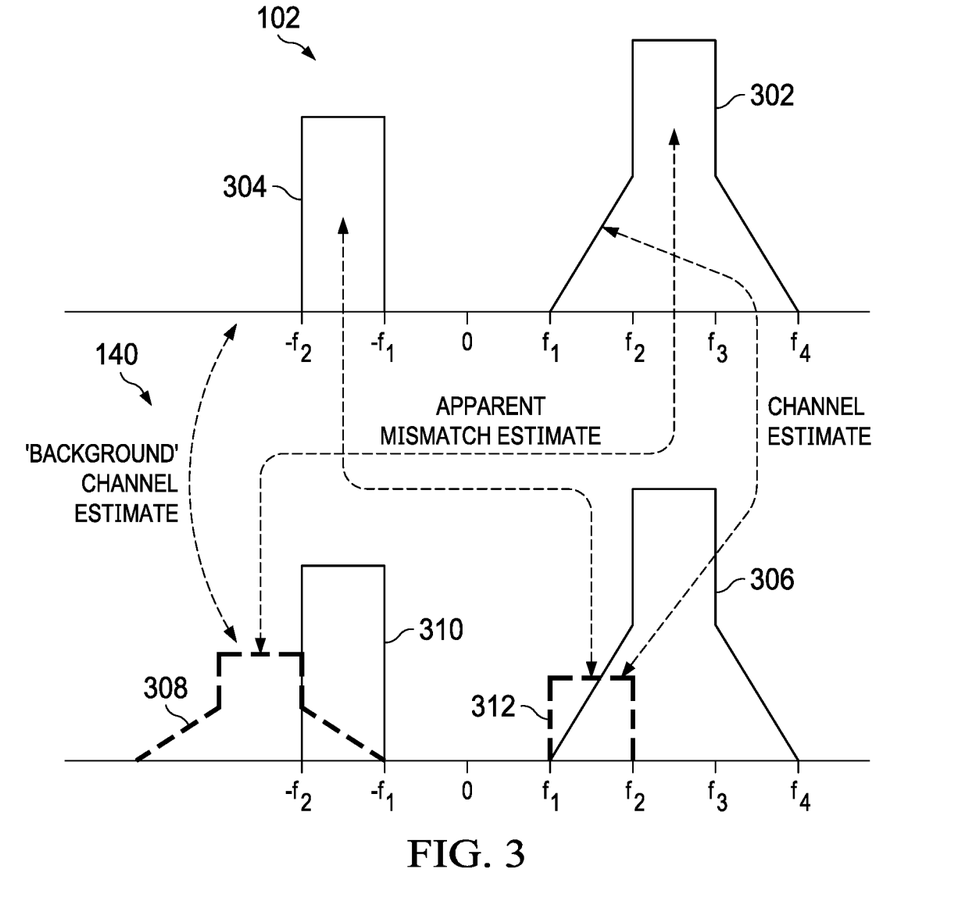
FIG. 3 shows example baseband data spectrum and example feedback baseband data spectrum in a zero-IF transmitter.

FIG. 3 shows an example of the transmit baseband data 102 and the feedback baseband data 140. The transmit baseband data 102 includes the signal 302 and the signal 304. Signals 302 and 304 represent the spectrum of the transmit baseband data. The feedback baseband data 140 includes signal 306 which a version of the signal 302 and signal 310 which is a version of the signal 304. The feedback baseband data 140 also includes a signal 308 that is a mirrored version of the signal 302 and a signal 312 that is a mirrored version of the signal 304 resulting from IQ mismatch in the transmit chain 103. Signals 306, 308, 310, and 312 represent the spectrum of the feedback baseband data. Raw mismatch estimates are computed based on the signal 302 and the signal 308, and on the signal 304 and the signal 312. Raw channel estimates are computed based on corresponding signal bins of the transmit baseband data 102 and the feedback baseband data 140.

To determine the I/Q mismatch correction coefficients, the I/Q mismatch estimate as seen at the transmit side should to be known. Termed the IQ-mismatch-ratio estimate, this value is obtained by dividing the raw IQ mismatch estimate, $H_{IQ}(f)$ at a frequency by the channel estimate at that frequency, $H_{ch}(f)$ as:

$$H_{rat,IQ}(f) = \frac{H_{IQ}(f)}{H_{ch}(f)} \quad (3)$$

This computation employs knowledge of the channel response at frequencies where the IQ image falls. Since transmit baseband data 102 need not necessarily be present at these frequencies, the channel response at such frequencies cannot be obtained directly through frequency domain correlations. At such frequencies the channel response is obtained through an impairment injection method (also known as background channel estimation method) performed by the background channel estimation circuit 210.

Once a channel estimate is computed at a given frequency (through either the signal correlation method or the injected impairment based method), a ratio of the channel estimate at that frequency with the corresponding value at another reference frequency bin is stored. This parameter is known as the channel ratio value and is stored for every frequency bin by the channel ratio tracking circuit 216. This channel ratio values allow for smooth tracking of channel estimate at a given frequency over time, even in the absence of signal at that frequency. All that is needed is that some signal be present at the reference frequency bin.

LO leakage correction is estimated by observing the DC at the feedback baseband data 140 and dividing it by the transmit-to-feedback channel estimate at the LO frequency (the LO frequency bin), which is obtained using the injected impairment method. The IQ mismatch correction circuit 104 compensates for LO leakage by subtracting out the DC estimate in the transmit baseband data 102. The LO leakage correction coefficient is estimated as:

$$LO_{corr} = \frac{FB_{DC}}{h_{LO}} - TX_{DC} \quad (4)$$

In the injected impairment based method (the background method) for channel estimation at the LO frequency, a known additional DC component is injected in the transmit baseband data 102. Over 2 timeslots, two different levels of this DC component are injected and corresponding DC estimates at both the transmit baseband data 102 and the feedback baseband data 140 are measured. The channel estimate is then obtained as follows:

$$H_{ch} = \frac{FB_{DC2} - FB_{DC1}}{(TX_{DC2} - TX_{DC1}) + (\Delta_2 - \Delta_1)} \quad (5)$$

where $\Delta_2$ and $\Delta_1$ are the injected DC components, $FB_{DC1}$ and $TX_{DC1}$ are the DC levels in the feedback baseband data 140 and the transmit baseband data 102 measured during the first timeslot, and $FB_{DC2}$ and $TX_{DC2}$ are the DC levels in the feedback baseband data 140 and the transmit baseband data 102 measured during the second timeslot.

Figure 4:
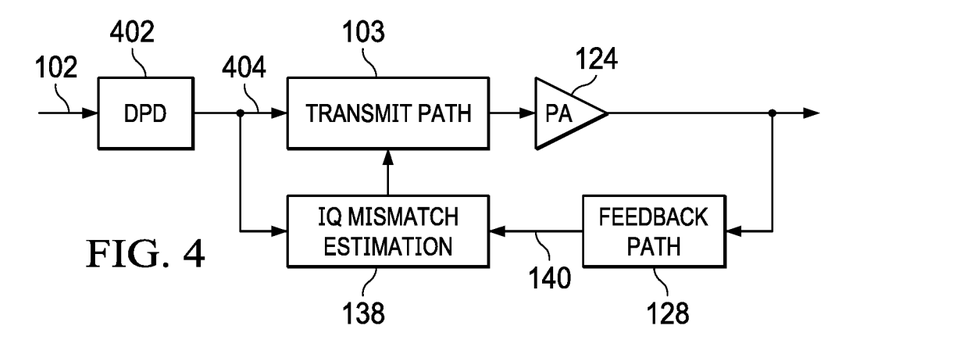
FIG. 4 shows an example zero-IF transmitter with digital predistortion.

When the IQ mismatch estimation circuit 238 is applied in an implementation of the zero-IF transmitter 100 that includes digital predistortion (DPD) to compensate for nonlinearity of the power amplifier 124, various issues arise. FIG. 4 shows an example zero-IF transmitter 400 with DPD. The zero-IF transmitter 400 includes a DPD circuit 402, the transmit chain 103, the power amplifier 124, the feedback chain 128 and the IQ mismatch estimation circuit 138. The zero-IF transmitter 400 is an implementation of the zero-IF transmitter 100. The DPD circuit 402 predistorts the transmit baseband data 102 to compensate for nonlinearity of the power amplifier 124. Accordingly, the predistortion added by the DPD circuit 402 is not present in the output of the power amplifier 124. In implementations of the zero-IF transmitter 400, the DPD circuit 402 is provided on a first integrated circuit, and the IQ mismatch estimation circuit 138 is provided on a second integrated circuit.

Figure 5:
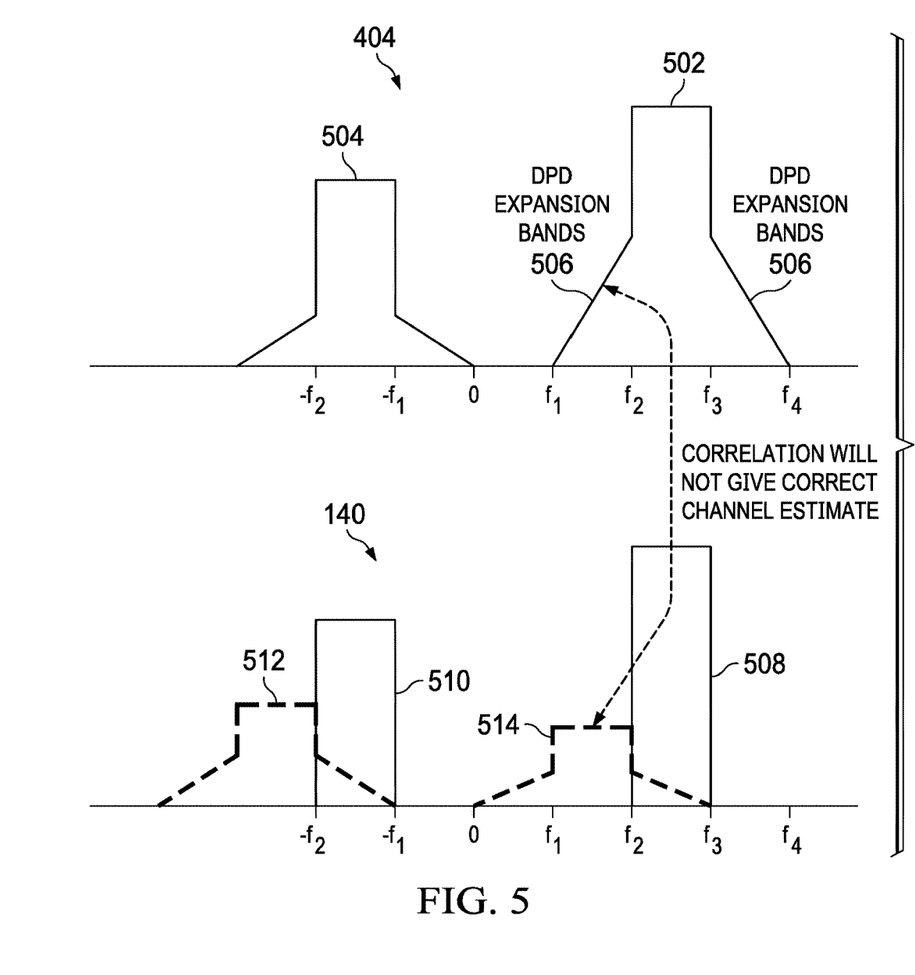
FIGS. 5 and 6 show example baseband data spectrum and feedback baseband data spectrum in a zero-IF transmitter with digital predistortion.

FIG. 5 shows example signals in the zero-IF transmitter 400. The predistorted signal 404 includes signal 502 and signal 504. Signals 502 and 504 represent the spectrum of the transmit baseband data. The predistortion applied to signal 502 produces DPD expansion bands 506. The feedback baseband data 140 includes signal 508 corresponding to the signal 502 without the DPD expansion bands and the signal 510 corresponding to the signal 504 without DPD expansion bands. The feedback baseband data 140 also includes signal 512 which is a mirrored version of the signal 502 caused by IQ mismatch in the transmit chain 103, the signal 514 which is a mirrored version of the signal 504 caused by IQ mismatch in the transmit chain 103. Signals 508, 510, 512, and 514 represent the spectrum of the feedback baseband data. Because the DPD expansion bands 506 are not present in the feedback baseband data 140, correlation of the signal 502 and the signal 508 will not produce an accurate channel estimate for the frequency bins corresponding to the DPD expansion bands. Application of inaccurate channel estimates produces incorrect IQ mismatch correction coefficients which limits system performance.

Figure 6:
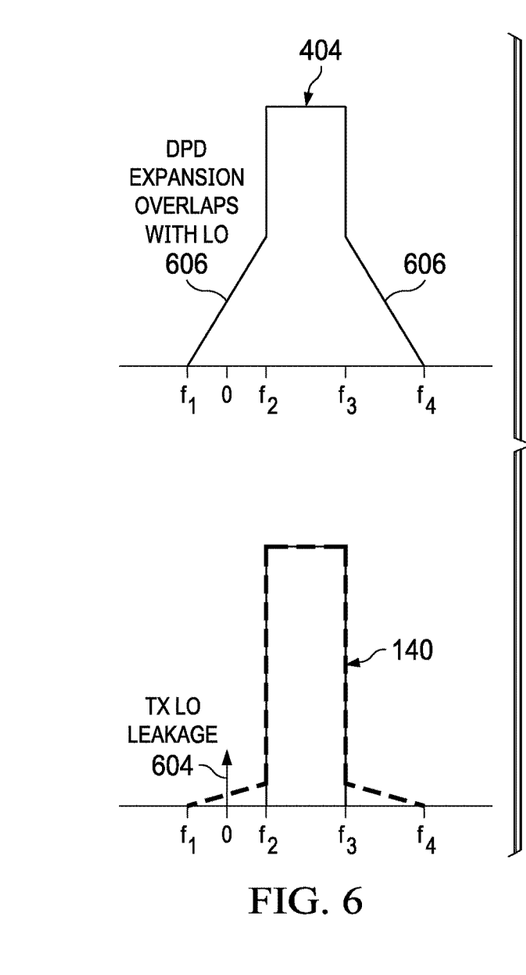

LO leakage correction is subject to a similar defect when the DPD expansion signal dominates the predistorted signal 404 around DC. FIG. 6 shows example signals in the zero-IF transmitter 400. The predistorted signal 404 (shown as transmit baseband spectrum) includes DPD expansion bands 606. In the feedback baseband data 140 (shown as feedback baseband spectrum), the DC offset 604 resulting from LO leakage is present, and the DPD expansion bands 606 are greatly suppressed by the non-linearity of the power amplifier 124. Because the DPD expansion bands 606 are not present in the feedback baseband data 140, correlation of the predistorted signal 404 and the feedback baseband data 140 will not produce an accurate channel estimate for the frequency bins corresponding to the DPD expansion bands. Application of inaccurate channel estimates at the DC bin produces incorrect LO leakage correction values which limits system performance.

Figure 7:
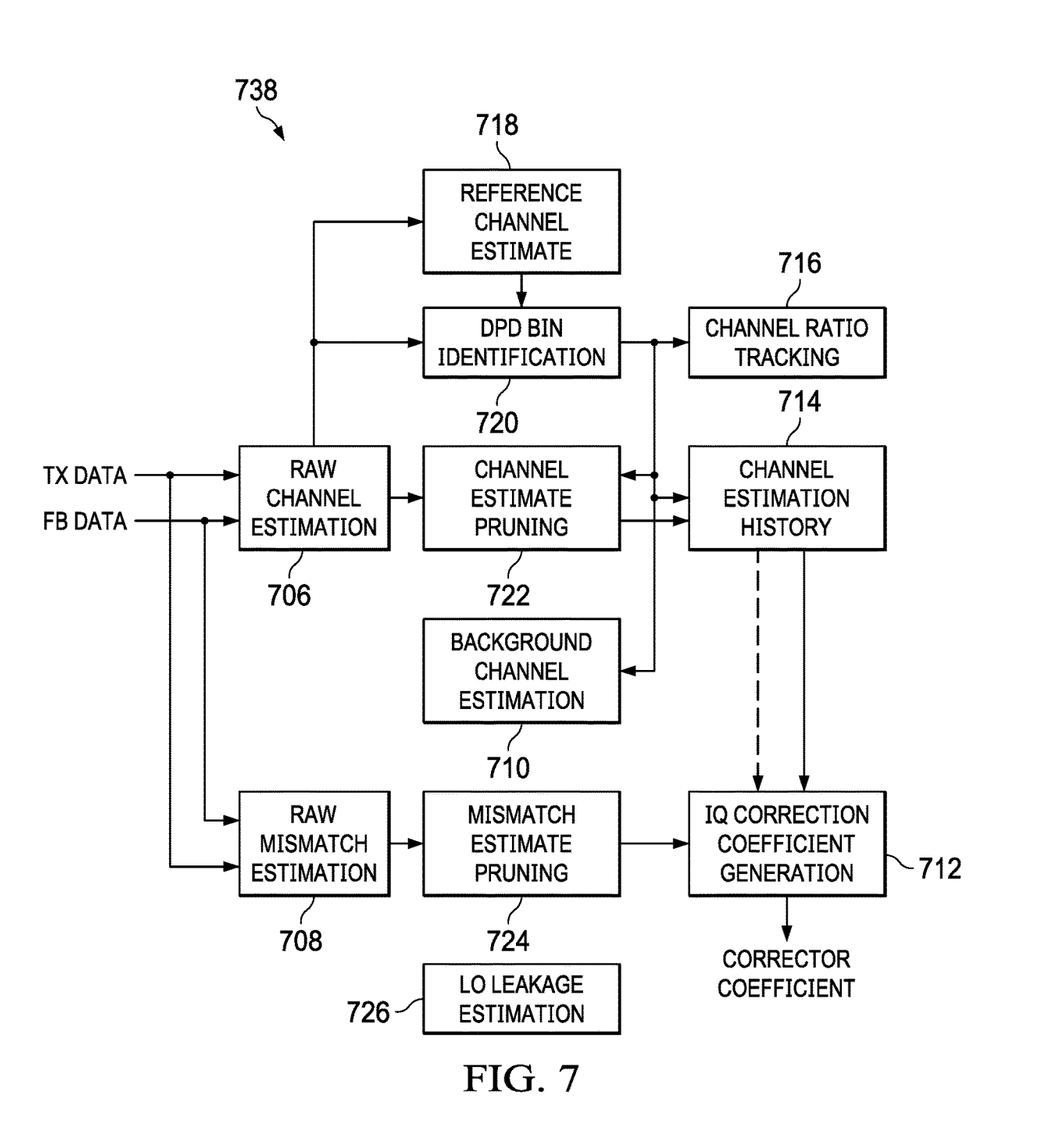
FIG. 7 shows an example IQ mismatch estimation circuit that provides improved IQ mismatch and LO correction with predistorted baseband data in accordance with the present disclosure.

FIG. 7 shows an example IQ mismatch estimation circuit 738 that provides improved IQ mismatch and LO correction in a zero-IF transmitter using DPD. The IQ mismatch estimation circuit 738 is an implementation of the IQ mismatch estimation circuit 138. The IQ mismatch estimation circuit 738 includes a raw channel estimation circuit 706, a raw mismatch estimation circuit 708, a background channel estimation circuit 710, an IQ correction coefficient generation circuit 712, a channel estimation history circuit 714, and a channel ratio tracking circuit 716. The raw channel estimation circuit 706, the raw mismatch estimation circuit 708, the background channel estimation circuit 710, the IQ correction coefficient generation circuit 712, and the channel estimation history circuit 714 are respectively similar to the raw channel estimation circuit 206, the raw mismatch estimation circuit 208, the background channel estimation circuit 210, the IQ correction coefficient generation circuit 212, and the channel estimation history circuit 214 of the IQ mismatch estimation circuit 238 and operate according to the descriptions thereof.

To provide improved performance in systems using DPD, the IQ mismatch estimation circuit 738 includes a reference channel estimation circuit 718, a DPD bin identification circuit 720, a channel estimate pruning circuit 722, and a mismatch estimate pruning circuit 724. The reference channel estimation circuit 718 analyzes the raw channel estimates generated by the raw channel estimation circuit 706 and identifies a reference channel estimate based on raw channel estimates. Some implementations of the reference channel estimation circuit 718 select a reference channel estimate based on the baseband signal powers of the raw channel estimates. For example, the reference channel estimation circuit 718 selects a reference channel estimate as the raw channel estimate produced by the raw channel estimation circuit 706 for a frequency bin having a largest signal power in the transmit baseband (largest baseband signal power). Some implementations of the reference channel estimation circuit 718 select a channel estimate having a best quality metric as the reference channel estimate. The reference channel estimation circuit 718 provides the reference channel estimate to the DPD bin identification circuit 720.

The DPD bin identification circuit 720 identifies frequency bins for which the raw channel estimates are based on (e.g., predominately based on) DPD expansion signal. A raw channel estimate based on DPD expansion signal is significantly attenuated in comparison to a raw channel estimate not based on DPD expansion signal. There are at least two reasons for the attenuation. The signal level at the frequency bin in feedback signal will be low because the frequency bin is dominated by DPD expansion. Additionally, since the cross correlation is accumulated across multiple Fast Fourier Transform (FFT) windows to generate the raw channel estimate, the raw channel estimate will not increase at the expected rate because the transmit and feedback back signals are not correlated for a bin dominated by DPD expansion. The DPD bin identification circuit 720 analyzes the raw channel estimates generated by the raw channel estimation circuit 706, and identifies raw channel estimates having magnitude (raw channel estimate magnitude) outside a predetermined range about the reference channel estimate as being based on a DPD expansion signal. For example, if a raw channel estimate magnitude is greater than or less than the reference channel estimate magnitude by more than a predetermined amount, then the DPD bin identification circuit 720 deems the raw channel estimate to be based on DPD expansion signal. This is because in most systems channel magnitude should not vary much across the band of interest. For example, the maximum variation could be +/−2 dB.

$$\text{if } |H_{ch}(f)| > th * |H_{ref}| \text{ or } |H_{ch}(f)| < \frac{|H_{ref}|}{th},$$

$$\text{then } f \text{ is a DPD bin}$$

The DPD bin identification circuit 720 signals the channel estimate pruning circuit 722 with regard to each raw channel estimate identified as being based on DPD expansion signal. The channel estimate pruning circuit 722 generates pruned channel estimates by discarding raw channel estimates that are based on DPD expansion signal, and/or ensures that such channel estimates are not provided to the channel estimation history circuit 714. For each raw channel estimate based on DPD expansion signal, the DPD bin identification circuit 720 also triggers the background channel estimation circuit 710 to perform a background channel estimate (generate background channel estimates) for frequency bins applied in IQ mismatch estimation. In some implementations, of the IQ mismatch estimation circuit 738, the channel estimation history circuit 714 clears or resets channel estimation history values and/or mismatch ratio estimate history for a frequency bin identified as a DPD bin by the DPD bin identification circuit 720 and if the channel estimate history was obtained from signal through the cross correlation mechanism shown in equation (1). If the channel estimate history indicates that the channel estimate is obtained from background channel estimation or some other mechanism which is not impacted by the DPD expansion, then the channel estimate history is not cleared. The channel ratio tracking circuit 716 resets the channel ratio values that are based on frequency bins whose channel history is cleared and for frequency bins that used bins whose channel history is cleared as a reference bin in some implementations.

The mismatch estimate pruning circuit 724 analyzes the signal power in the frequency bins and discards mismatch estimates based on the signal power. The mismatch estimate pruning circuit 724 identifies the frequency bin having the largest signal power, and selects this largest signal power as the reference power. The mismatch estimate pruning circuit 724 compares the signal power of each frequency bin to the reference power, and generates pruned mismatch estimates by discarding raw mismatch estimates for frequency bins whose transmit signal power is less than the reference power by at least a predetermined amount (e.g., a predetermined dB lower than the reference power).

if $|P(f)| < th^* P_{ref}$, then discard $H_{IQ}(-f)$

Figure 8:
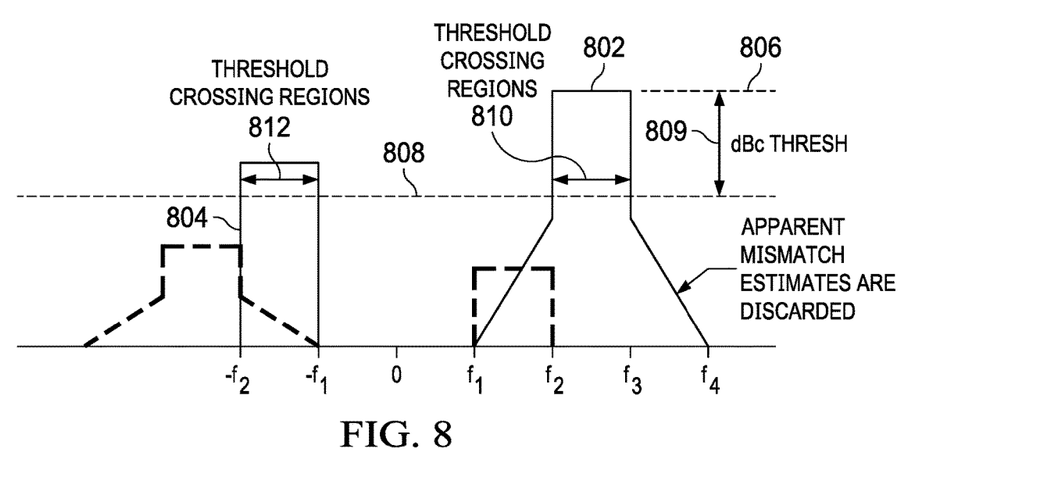
FIG. 8 shows an example of mismatch estimate pruning in accordance with the present disclosure.

FIG. 8 shows an example of mismatch estimate pruning. FIG. 8 shows signals 802 and 804. The mismatch estimate pruning circuit 724 analyzes the signal power in frequency bins corresponding to the signals 802 and 804 and selects signal power 806 as the reference power. The threshold 808 for pruning is determined based on the reference power 806 and the predetermined power offset 809. Mismatch estimates for all frequency bins with signal power below the threshold 808 are discarded, and mismatch estimates for all frequency bins with signal power at or above the threshold 808 are retained.

Figure 9:
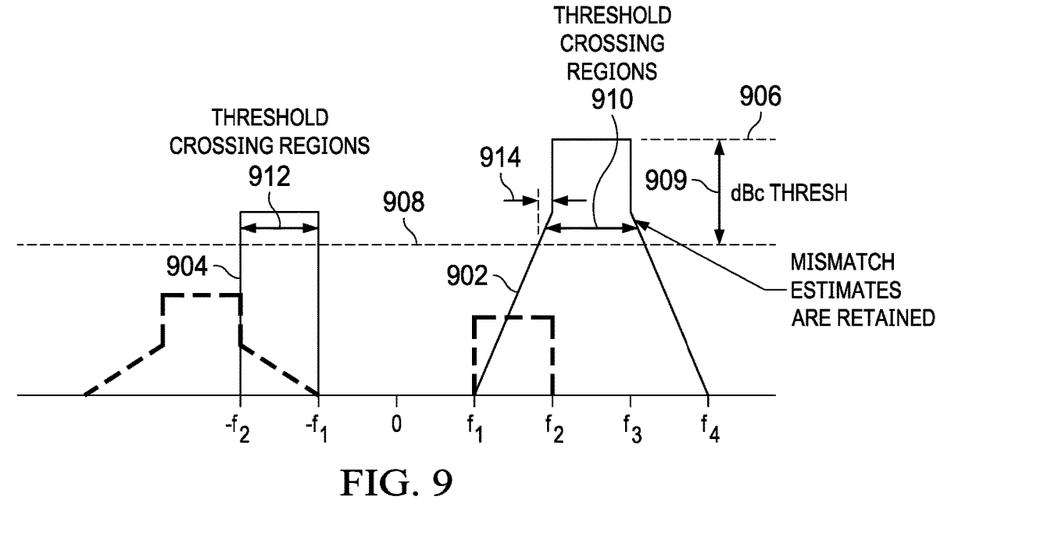
FIG. 9 shows an example of mismatch estimate pruning that retains mismatch estimates based on DPD expansion signal in accordance with the present disclosure.

The mismatch estimate pruning circuit 724 allows for retention of mismatch estimates based on DPD expansion signals, where the signal power is high. FIG. 9 shows an example of mismatch estimate pruning that retains mismatch estimates based on DPD expansion signal. FIG. 9 shows signals 902 and 904. The mismatch estimate pruning circuit 724 analyzes the signal power in frequency bins corresponding to the signals 902 and 904 and selects signal power 906 as the reference power. The threshold 908 for pruning is determined based on the reference power 906 and the predetermined power offset 909. Mismatch estimates for all frequency bins with signal power below the threshold 908 are discarded, and mismatch estimates for all frequency bins with signal power at or above the threshold 908 are retained. The mismatch estimates for the frequency bins 914 are based on DPD expansion signal and are above the threshold 908 and are therefore retained.

Some implementations of the IQ mismatch estimation circuit 738 also include LO leakage estimation circuitry 726. The LO leakage estimation circuitry 726 analyzes the parameters applied to compute a channel estimate for the DC bin to determine whether the channel estimate is suitable for use. If the channel estimate is deemed unsuitable for use, then the LO leakage estimation circuitry 726 signals the background channel estimation circuit 710 to execute a background channel estimation with a different value of injected impairment. These operations are described as:

if $|TX_{Dc2} - TX_{DC1}| < th1^* |\Delta_2 - \Delta_1|$, then the channel estimate is deemed suitable for use in LO leakage estimation (12 dB is an example value of th1);

else the channel estimate is deemed unsuitable for use and the background channel estimation circuit 710 is triggered with an updated injected impairment level such that $|\Delta_{2,new} - \Delta_{1,new}| = th2 |\Delta_2 - \Delta_1|$, where, for example, th2 is +15 dB.

The operations are repeated until a suitable channel estimate is obtained based on the proposition that if the injected DC signal dominates the DPD expansion signal, then the error in the channel estimate is low.

Figure 10:
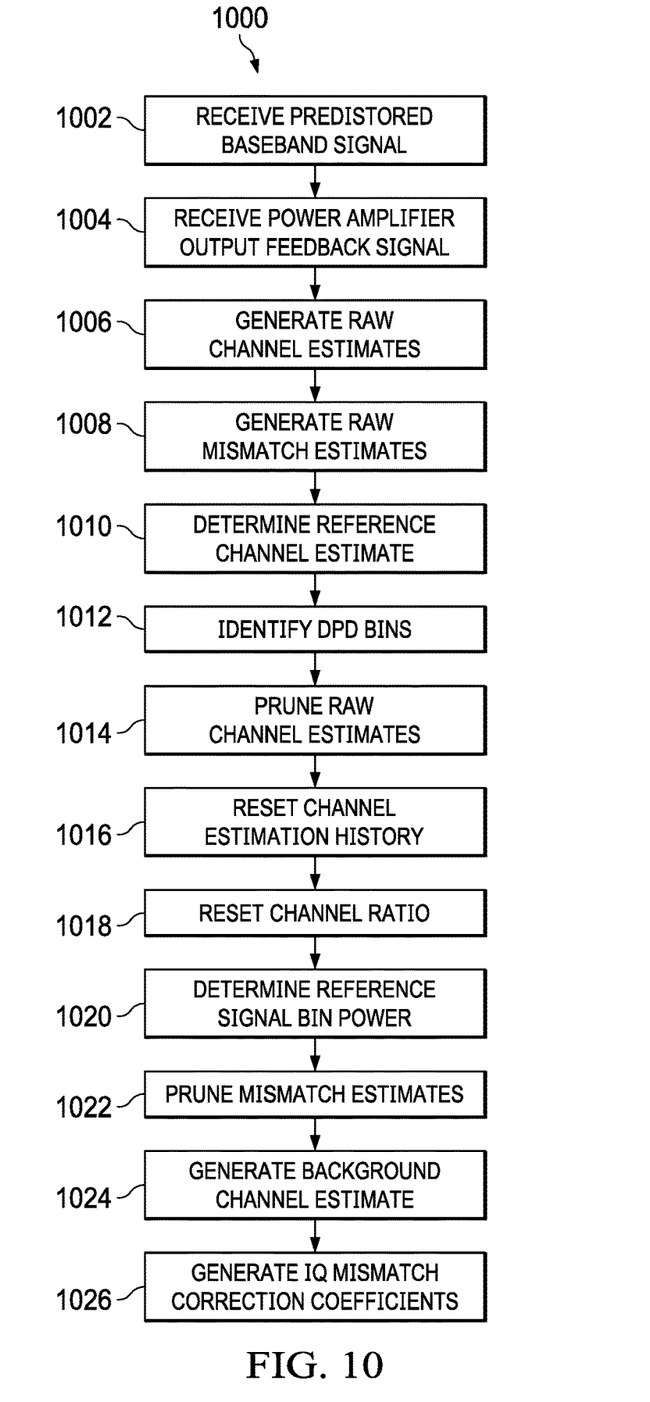
FIG. 10 shows a flow diagram for a method for IQ mismatch estimation in accordance with the present disclosure.

FIG. 10 shows a flow diagram for a method 1000 for IQ mismatch estimation in accordance with the present disclosure. Though depicted sequentially as a matter of convenience, at least some of the actions shown can be performed in a different order and/or performed in parallel. Additionally, some implementations may perform only some of the actions shown. Operations of the method 1000 are performed by an implementation of the zero-IF transmitter 100.

In block 1002, the IQ mismatch estimation circuit 138 receives a predistorted signal 404 (the transmit baseband data 102 predistorted by the DPD circuit 402). The transmit chain 103 processes the predistorted signal 404 for transmission.

In block 1004, the IQ mismatch estimation circuit 138 receives the feedback baseband data 140 output by the power amplifier 124.

In block 1006, the raw channel estimation circuit 706 processes the predistorted signal 404 and the feedback baseband data 140 to generate raw channel estimates for various frequency bins of the predistorted signal 404 and the feedback baseband data 140. For example, the raw channel estimation circuit 706 generates the raw channel estimates per equation (2) in some implementations of the zero-IF transmitter 100.

In block 1008, the raw mismatch estimation circuit 708 processes the predistorted signal 404 and the feedback baseband data 140 to generate raw mismatch estimates for the frequency bins of the predistorted signal 404 and the feedback baseband data 140. For example, the raw mismatch estimation circuit 708 generates the raw mismatch estimates per equation (1) in some implementations of the zero-IF transmitter 100.

In block 1010, the reference channel estimation circuit 718 analyzes the raw channel estimates generated by the raw channel estimation circuit 706, and selects a reference channel estimate. For example, the reference channel estimation circuit 718 selects the channel estimate produced by the raw channel estimation circuit 706 for a frequency bin having a largest transmit signal power to be the reference channel estimate.

In block 1012, the DPD bin identification circuit 720 identifies the frequency bins for which the raw channel estimates are based on a DPD expansion signal. For example, the DPD bin identification circuit 720 analyzes the raw channel estimates generated by the raw channel estimation circuit 706, and identifies raw channel estimates whose magnitude is outside a predetermined range about the reference channel estimate magnitude as being based on a DPD expansion signal.

In block 1014, the channel estimate pruning circuit 722 generates pruned channel estimates by discarding raw channel estimates that are based on DPD expansion signal. That is, channel estimates for the frequency bins identified by the DPD bin identification circuit 720 are discarded.

In block 1016, the channel estimation history circuit 714 clears or resets channel estimation history values and/or mismatch ratio estimate history for all frequency bins which are identified as DPD expansion bins and whose channel estimate history is obtained from the transmit baseband data 102.

In block 1018, the channel ratio tracking circuit 716 resets the channel ratio value for each frequency bin whose channel estimation history is cleared and, in some implementations, for frequency bins that used bins whose channel estimation history was cleared as a reference bin.

In block 1020, the mismatch estimate pruning circuit 724 analyzes the signal power in the frequency bins, identifies the frequency bin having the largest signal power, and selects this largest signal power as the reference power.

In block 1022, the mismatch estimate pruning circuit 724 prunes the mismatch estimates by comparing the signal power of each frequency bin to the reference power, and discarding mismatch estimates that are less than the reference power by at least a predetermined amount (e.g., a predetermined dB lower than the reference power).

In block 1024, for each raw channel estimate that is based on DPD expansion signal, the background channel estimation circuit 710 performs a background channel estimation using injected impairment signals if a given frequency bin is to be applied to IQ mismatch estimation.

In block 1026, the IQ correction coefficient generation circuit 712 generates IQ mismatch correction coefficients for application by the IQ mismatch correction circuit 104 to compensate for IQ mismatch in the transmit chain 103. The IQ correction coefficient generation circuit 712 generates IQ mismatch correction coefficients based on the pruned mismatch estimates provided by the mismatch estimate pruning circuit 724 and the pruned channel estimates provided by the channel estimate pruning circuit 722. Implementations of the IQ correction coefficient generation circuit 712 generate the IQ mismatch correction coefficients as:

$$H_{CORR}(-f) = \frac{H_{IQ}(-f)}{H_{CH}(-f)}.$$

At frequency bins where pruned channel estimates are not available, background channel estimation is performed to obtain a channel estimate.

Figure 11:
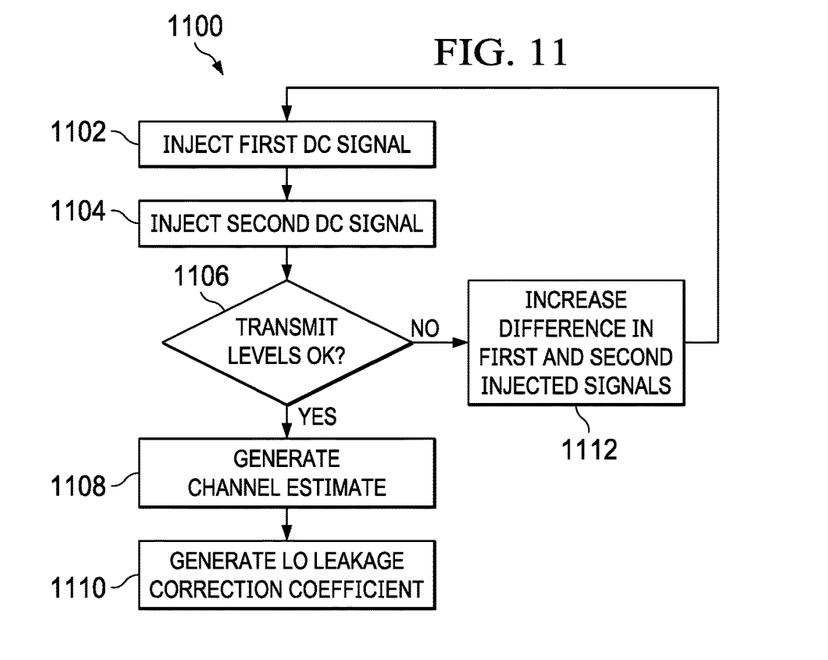
FIG. 11 shows a flow diagram for a method for LO leakage estimation in accordance with the present disclosure.

FIG. 11 shows a flow diagram for a method 1100 for LO leakage estimation in accordance with the present disclosure. Though depicted sequentially as a matter of convenience, at least some of the actions shown can be performed in a different order and/or performed in parallel. Additionally, some implementations may perform only some of the actions shown. Operations of the method 1100 are performed by an implementation of the zero-IF transmitter 100.

In block 1102, the background channel estimation circuit 710 injects a first DC signal into the transmit baseband data 102 during a first timeslot.

In block 1104, the background channel estimation circuit 710 injects a second DC signal into the transmit baseband data 102 during a second timeslot.

In block 1106, the LO leakage estimation circuitry 726 determines whether the measured difference in DC transmission signal level is less than the difference in the injected DC signal levels by at least a predetermined amount.

If, in block 1106, the measured magnitude difference in DC transmission signal level is not less than the magnitude difference of the injected DC signal levels by at least the predetermined amount, then the difference in the levels of the injected signals is increased in block 1112 (e.g., increased by 15 dB), and the updated DC signals are injected into the transmit baseband data 102 in block 1102 and block 1104.

If, in block 1106, the measured difference in DC transmission signal level is less than the difference in the injected DC signal levels by at least the predetermined amount, then the background channel estimation circuit 710 generates a channel estimate for the DC bin in block 1108.

A channel estimate at DC may also be available from the channel estimation history circuit 714 in I/Q mismatch.

In block 1110, the LO leakage estimation circuitry 726 generates a LO leakage correction coefficient for application by the IQ mismatch correction circuit 104 to compensate for LO leakage in the transmit chain 103.

Figure 12:
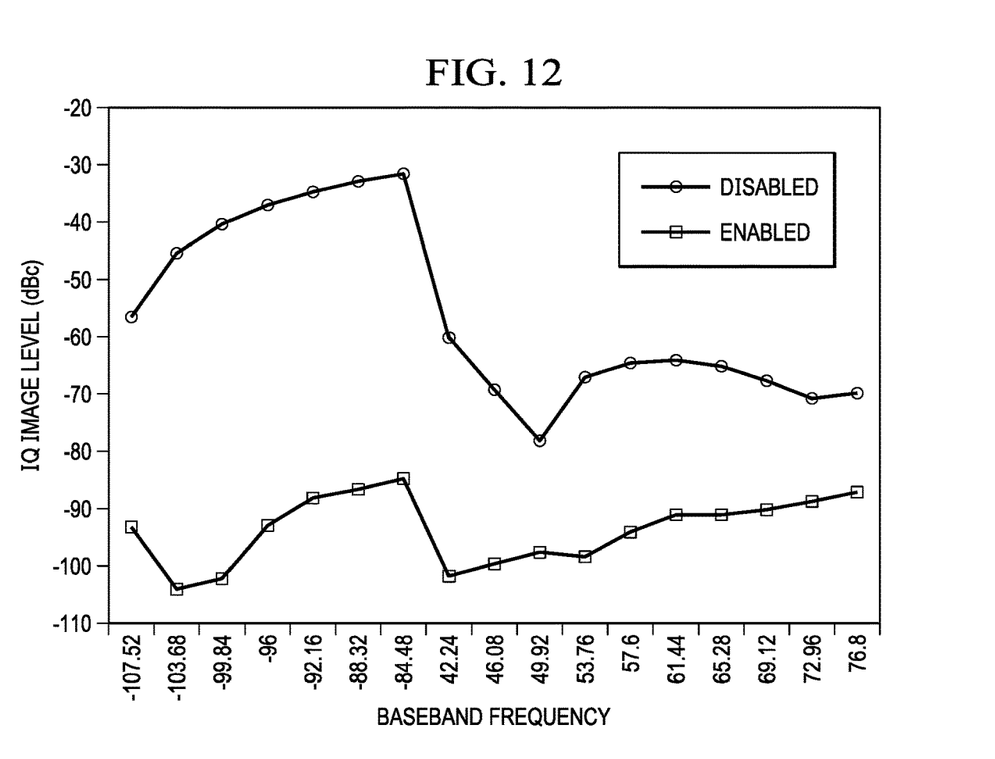
FIG. 12 shows I/Q mismatch compensation performance with and without the digital predistortion features of the present disclosure.

FIG. 12 shows I/Q mismatch compensation performance with the DPD features of the IQ mismatch estimation circuit 738 enabled and disabled. As shown in FIG. 12, IQ image level is substantially decreased by the DPD features of the IQ mismatch estimation circuit 738.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An in-phase and quadrature (IQ) mismatch estimation circuit, comprising:
    a raw channel estimation circuit configured to generate raw channel estimates for a plurality of frequency bins of a baseband signal;
    a reference channel estimation circuit configured to identify a reference channel estimate based on the raw channel estimates;
    a digital predistortion (DPD) bin identification circuit configured to identify, based on the reference channel estimate, the frequency bins for which the raw channel estimates are based on a DPD expansion signal;
    a channel estimate pruning circuit configured to generate pruned raw channel estimates by discarding the raw channel estimates of the frequency bins identified by the DPD bin identification circuit; and
    an IQ correction coefficient generation circuit configured to generate IQ mismatch correction coefficients based on the pruned raw channel estimates.

2. The IQ mismatch estimation circuit of claim 1, wherein the DPD bin identification circuit is configured to identify the frequency bins for which the raw channel estimates are based on the DPD expansion signal as the frequency bins for which a raw channel estimate magnitude is outside a predetermined range about a reference channel estimate magnitude.

3. The IQ mismatch estimation circuit of claim 1, further comprising:
    a raw mismatch estimation circuit configured to generate raw mismatch estimates for the plurality of frequency bins of the baseband signal; and
    a mismatch estimate pruning circuit configured to generate pruned mismatch estimates by discarding the raw mismatch estimates of the frequency bins for which a transmit signal power of the frequency bins is less than a largest transmit signal power of the frequency bins by at least a predetermined amount.

4. The IQ mismatch estimation circuit of claim 3, wherein the IQ correction coefficient generation circuit is configured to generate the IQ mismatch correction coefficients based on the pruned mismatch estimates.

5. The IQ mismatch estimation circuit of claim 1, further comprising a background channel estimation circuit configured to generate background channel estimates for the frequency bins for which the raw channel estimates are discarded by the DPD bin identification circuit.

6. The IQ mismatch estimation circuit of claim 1, further comprising a channel estimation history circuit configured to:
   store channel estimation history values for the frequency bins; and
   reset the channel estimation history values for frequency bins for which channel estimation history values are obtained using cross-correlation and for which the raw channel estimates are based on the DPD expansion signal.

7. The IQ mismatch estimation circuit of claim 1, further comprising a channel ratio tracking circuit configured to:
   store channel ratio values for the frequency bins; and
   reset the channel ratio values that are based on frequency bins for which channel history is cleared.

8. The IQ mismatch estimation circuit of claim 1, further comprising local oscillator leakage estimation circuitry configured to generate a background channel estimate for a direct current (DC) bin with a first injected signal and a second injected signal having a difference that is greater in magnitude, by at least a predetermined amount, than a magnitude difference in DC in a first timeslot of the baseband signal and a second timeslot of the baseband signal respectively transmitted with the first injected signal and the second injected signal.

9. A zero intermediate frequency (IF) transmitter, comprising:
   a power amplifier circuit configured to amplify a signal to be transmitted;
   a digital predistortion (DPD) circuit configured to pre-compensate a baseband signal for non-linearity of the power amplifier circuit;
   an in-phase and quadrature (IQ) mismatch estimation circuit comprising:
      a raw channel estimation circuit configured to generate raw channel estimates for a plurality of frequency bins of a predistorted baseband signal;
      a reference channel estimation circuit configured to identify a reference channel estimate based on the raw channel estimates and baseband signal powers at the plurality of frequency bins;
      a DPD bin identification circuit configured to identify, based on the reference channel estimate, the frequency bins for which the raw channel estimates are based on a DPD expansion signal;
      a channel estimate pruning circuit configured to generate pruned raw channel estimates by discarding the raw channel estimates of the frequency bins identified by the DPD bin identification circuit; and
      an IQ correction coefficient generation circuit configured to generate IQ mismatch correction coefficients based on the pruned raw channel estimates; and
   an IQ mismatch correction circuit configured to apply the IQ mismatch correction coefficients to compensate the predistorted baseband signal for IQ mismatch.

10. The zero IF transmitter of claim 9, wherein the DPD bin identification circuit is configured to identify the frequency bins for which the raw channel estimates are based on the DPD expansion signal as the frequency bins for which a raw channel estimate magnitude is outside a predetermined range about a reference channel estimate magnitude.

11. The zero IF transmitter of claim 9, wherein the IQ mismatch estimation circuit further comprises:
   a raw mismatch estimation circuit configured to generate raw mismatch estimates for the plurality of frequency bins of the predistorted baseband signal; and
   a mismatch estimate pruning circuit configured to generate pruned mismatch estimates by discarding the raw mismatch estimates of the frequency bins for which a transmit signal power of the frequency bins is less than a largest transmit signal power of the frequency bins by at least a predetermined amount.

12. The zero IF transmitter of claim 11, wherein the IQ correction coefficient generation circuit is configured to generate the IQ mismatch correction coefficients based on the pruned mismatch estimates.

13. The zero IF transmitter of claim 9, wherein the IQ mismatch estimation circuit further comprises a background channel estimation circuit configured to generate background channel estimates for frequency bins for which the raw channel estimates are based on the DPD expansion signal.

14. The zero IF transmitter of claim 9, wherein the IQ mismatch estimation circuit further comprises a channel estimation history circuit configured to:
   store channel estimation history values for the frequency bins; and
   reset channel estimation history values for frequency bins for which channel estimation history values are obtained using cross correlation and for which the raw channel estimates are based on the DPD expansion signal.

15. The zero IF transmitter of claim 9, wherein the IQ mismatch estimation circuit further comprises a channel ratio tracking circuit configured to:
   store channel ratio values for the frequency bins; and
   reset channel ratio values that are based on frequency bins for which channel history is cleared.

16. The zero IF transmitter of claim 9, wherein the IQ mismatch estimation circuit further comprises local oscillator leakage estimation circuitry configured to generate a background channel estimate for a direct current (DC) bin with a first injected signal and a second injected signal having a difference that is greater in magnitude, by at least a predetermined amount, than a magnitude of difference in DC in a first timeslot of the baseband signal and a second timeslot of the baseband signal respectively transmitted with the first injected signal and the second injected signal.

17. A method for in-phase and quadrature (IQ) mismatch estimation comprising:
   generating raw channel estimates for a plurality of frequency bins of a baseband signal predistorted by digital predistortion (DPD);
   identifying a reference channel estimate based on the raw channel estimates;
   identifying, based on the reference channel estimate, the frequency bins for which the raw channel estimates are predominately based on a DPD expansion signal;
   generating pruned raw channel estimates by discarding the raw channel estimates of the frequency bins identified as predominately based on the DPD expansion signal; and
   generating IQ mismatch correction coefficients based on the pruned raw channel estimates.

18. The method of claim 17, further comprising identifying the frequency bins for which the raw channel estimates are based on the DPD expansion signal as the frequency bins for which a raw channel estimate magnitude is outside a predetermined range about a reference channel estimate magnitude.

19. The method of claim 17, further comprising:
generating raw mismatch estimates for the plurality of frequency bins of the baseband signal predistorted by DPD;
generating pruned mismatch estimates by discarding the raw mismatch estimates of the frequency bins for which a transmit signal power of the frequency bins is less than a largest transmit signal power of the frequency bins by at least a predetermined amount; and
generating the IQ mismatch correction coefficients based on the pruned mismatch estimates.

20. The method of claim 17, further comprising generating a background channel estimate for the frequency bins for which the raw channel estimates are based on the DPD expansion signal.

21. The method of claim 17, further comprising:
storing channel estimation history values for the frequency bins; and
resetting the channel estimation history values for the frequency bins for which the channel estimation history values are obtained using cross correlation and for which the raw channel estimates are based on the DPD expansion signal.

22. The method of claim 17, further comprising:
storing channel ratio values for the frequency bins; and
resetting the channel ratio values that are based on frequency bins for which channel history is cleared.

23. The method of claim 17, further comprising:
generating a background channel estimate for a direct current (DC) bin with a first injected signal and a second injected signal having a difference that is greater in magnitude, by at least a predetermined amount, than a magnitude of difference in DC in a first timeslot of the baseband signal and a second timeslot of the baseband signal respectively transmitted with the first injected signal and the second injected signal; and
generating a local oscillator leakage correction coefficient based on the background channel estimate for a local oscillator frequency bin.

* * * * *